May 7, 1935.   E. L. TURNBAUGH   2,000,365
DUAL CENTURY CALENDAR
Filed April 4, 1933    6 Sheets-Sheet 1

May 7, 1935.  E. L. TURNBAUGH  2,000,365
DUAL CENTURY CALENDAR
Filed April 4, 1933    6 Sheets-Sheet 5

Inventor
E. L. Turnbaugh.
By Lacey & Lacey, Attorneys

May 7, 1935.  E. L. TURNBAUGH  2,000,365
DUAL CENTURY CALENDAR
Filed April 4, 1933  6 Sheets-Sheet 6

Fig. 25.

Inventor
E. L. Turnbaugh.
By Lacey & Lacey, Attorneys

Patented May 7, 1935

2,000,365

UNITED STATES PATENT OFFICE 2,000,365

DUAL CENTURY CALENDAR

Elbert L. Turnbaugh, Reno, Nev., assignor to Eternal Calendar Corporation, San Francisco, Calif., a corporation of California Application April 4, 1933, Serial No. 664,396

10 Claims. (Cl. 40—115)

This invention relates to calendars and more particularly to those which are continuous or perpetual in character, and has for an object to provide a simple, novel, durable and accurate mechanical calendar operated by clock work controlled by a single knob, to correctly indicate throughout two centuries, the day of the week in every year, the month in every year and the day of the month in every year, the illustrated embodiment of the invention beginning with January 1st, 1800 and terminating December 31st, 1999.

A further object is to provide a dual century calendar which will embody novel mechanism to provide for the additional day occurring in each leap year.

A further object is to provide a calendar of this type which will be simple in construction, light and compact in form, and will not easily get out of order.

With the above and other objects in view the invention consists of certain novel details of construction and combinations of parts hereinafter fully described and claimed.

In the accompanying drawings forming part of this specification,

Figure 5 is a reduced detail section taken on the line 5—5 of Figure 3.

Figure 6 is a reduced detail section taken on the line 6—6 of Figure 3,

Figure 12 is a fragmentary elevation showing the five tooth section removed from one of the gears and reduced to four teeth as shown by dotted lines, to be fixed to one of the adjacent gears, as shown in Figure 9, Figure 17 is a perspective of the key gear, Figs. 18 to 24 inclusive, are diagrammatic views showing progressive positions assumed by certain of the gears when the knob is turned.

Referring now to the drawings in which like characters of reference designate similar parts in the various views, the calendar casing comprises a back wall 10, a front wall 11 and a cylindrical wall 12. A division wall 13 is disposed between the front and back walls and in this division wall and the back wall are journaled the various shafts of the apparatus. A foot 14, carried by the cylindrical wall supports the casing upright.

Figure 1:
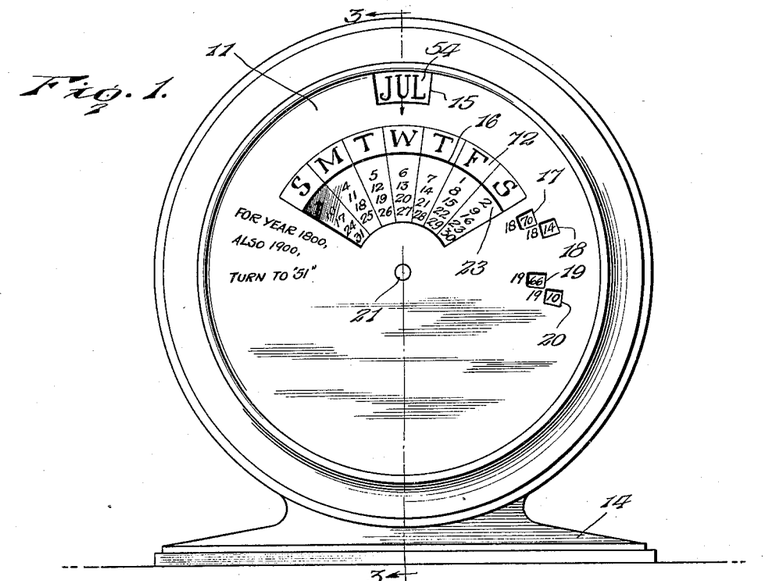
Figure 1 is a front elevation of the calendar.

As shown best in Figure 1, the front wall is provided with a plurality of concentric sight openings, 15 at the top through which the dial bearing the month designations is exposed, 16 above the center through which the dial bearing the week day designations is exposed, and 17 to 20 inclusive, disposed laterally of the center through which the dial bearing the year designations is exposed.

A main shaft 21 is mounted at the center of the casing and outside the back wall is equipped with a knob 22. Inside of the front wall the shaft is equipped with a circular week day dial 23 carrying three groups of numbers 1 to 31, inclusive, arranged spirally and designating the days of the month, and so disposed that when looking through the sight opening 16 the numbers visible always show 31 days.

Figures 3, 13, 14, 15, 16:
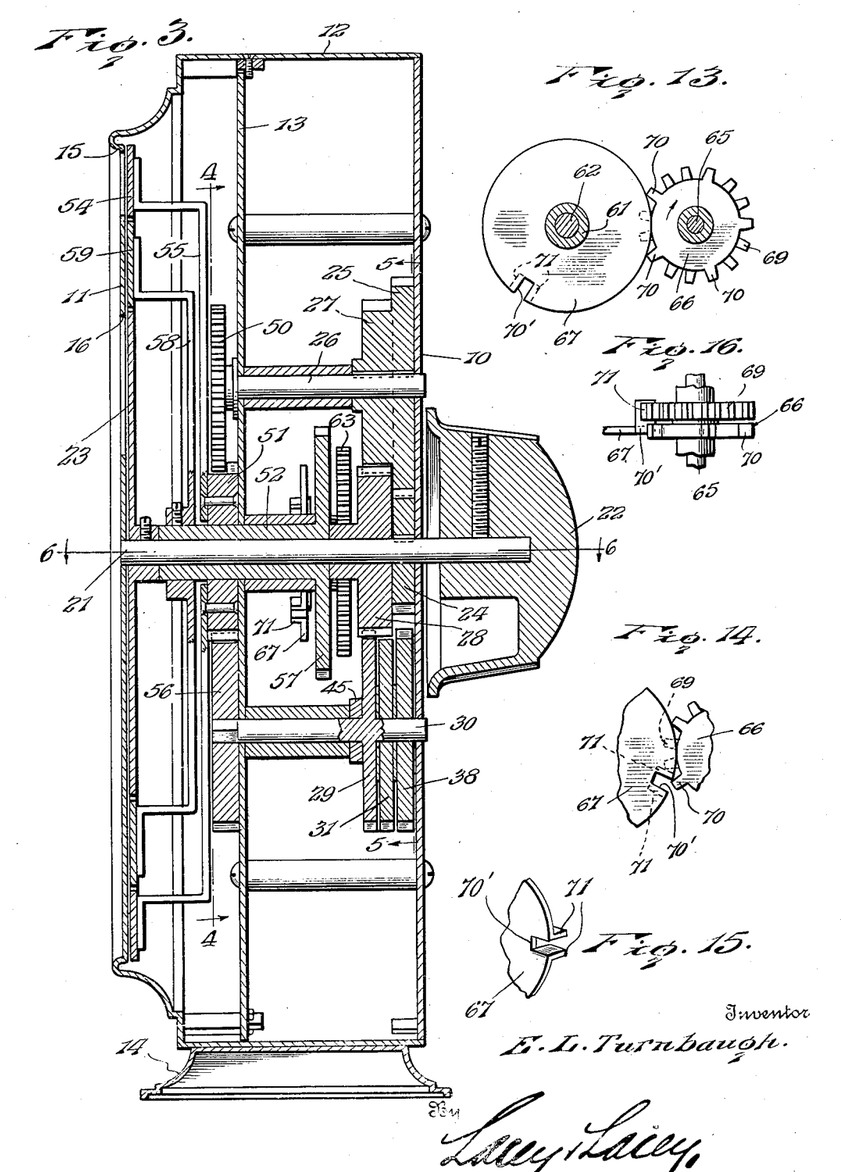
Figure 3 is an enlarged vertical section of the calendar on the line 3—3 of Figure 1.
Figure 13 is a detail section taken on the line 13—13 of Figure 4.
Figure 14 is a fragmentary detail showing the manner of meshing of the parts shown in Fig. 13.
Figure 15 is a perspective showing the groove and two teeth of one of the parts shown in Figure 13.
Figure 16 is a plan view of the parts in Figure 13 meshed.

Fixed to the main shaft is a gear 24 having 21 teeth which meshes with a gear 25 fixed on a shaft 26 disposed above the main shaft, see Figure 3, and having thirty-six teeth. Integral with the gear 25 is a gear 27 having also thirty-six teeth. The gear 27 meshes with a gear 28 having thirty-six teeth. The gear 28 is loosely mounted upon the main shaft 21 and is free to move in either direction. A gear 29 is fixed to a shaft 30 below the main shaft and a gear 31 of forty-eight teeth is loosely mounted on the shaft 30 at one side of the gear 29. Both of these gears are meshed with the gear 28, as shown best in Figure 3.

Figure 9:
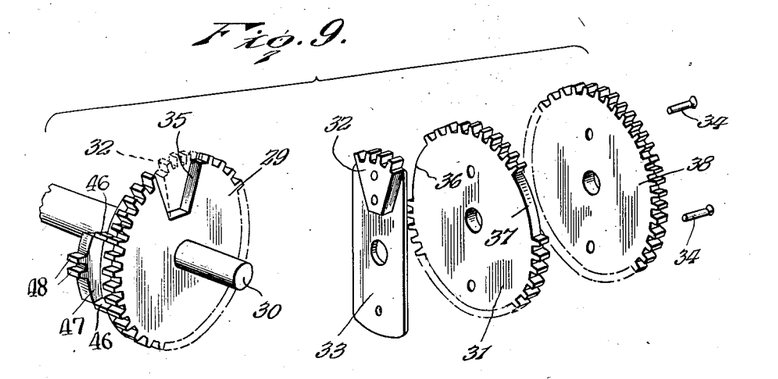
Figure 9 is a detail perspective of the gears that provide for the additional day occurring in each leap year.
Figure 10:
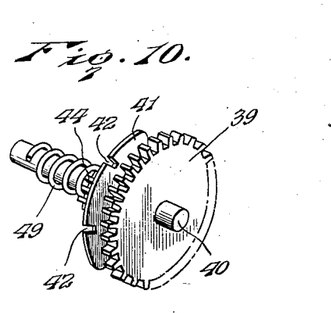
Figure 10 is a detail perspective of the brake spring and gear which co-ordinates with the parts shown in Figure 9.
Figure 11:
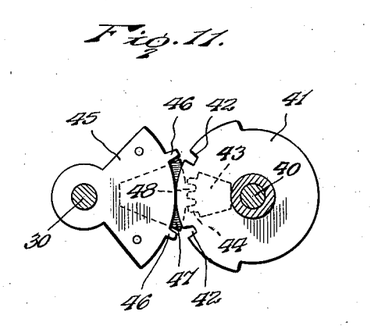
Figure 11 is a detail section taken on the line 11—11 of Figure 8.
Figures 12, 17:
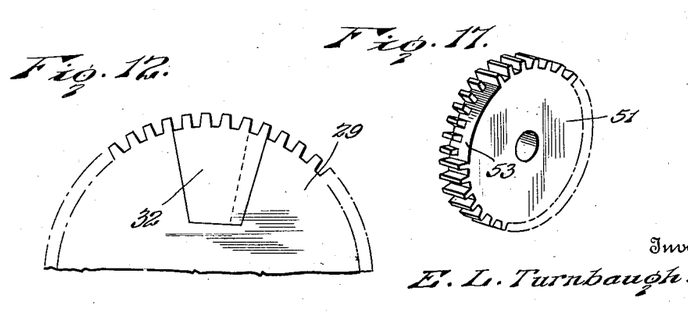

By now referring to Figure 12 it will be seen that the gear 29 has a section 32 of five teeth removed and reduced to four teeth as shown by the dotted line in said figure and in full lines in Figure 9. Before removing the section this gear also had forty-eight teeth. The removed section, reduced to four teeth, is rigidly secured to the side of the gear 31 preferably by a plate 33 and rivets 34. When the gear 31 is placed in position on the shaft 30 the section 32 of four teeth secured on gear 31 projects into the space 35 in the gear 29 from which the section of five teeth was removed.

In so much as the gear 31 is loose on the shaft 30 and due to the fact that there exists a space equivalent to one tooth on the gear 29, the gear 31 can advance only one tooth in either direction whereupon it forces the gear 29 to turn with it. The object of this one tooth play is to provide for an extra day in each leap year as will hereinafter be more fully explained.

The gear 31 has six teeth removed at two spaced points, as indicated at 36 and 37 in Figure 9, on opposite sides of the section 32. This permits the gear 31 to advance or subtract one tooth, depending on the direction turned, as will be later more fully described. The object of this construction is to permit the gear 31 to be placed in such position that when leap year occurs the extra day will register correctly.

Figures 4, 7, 8:
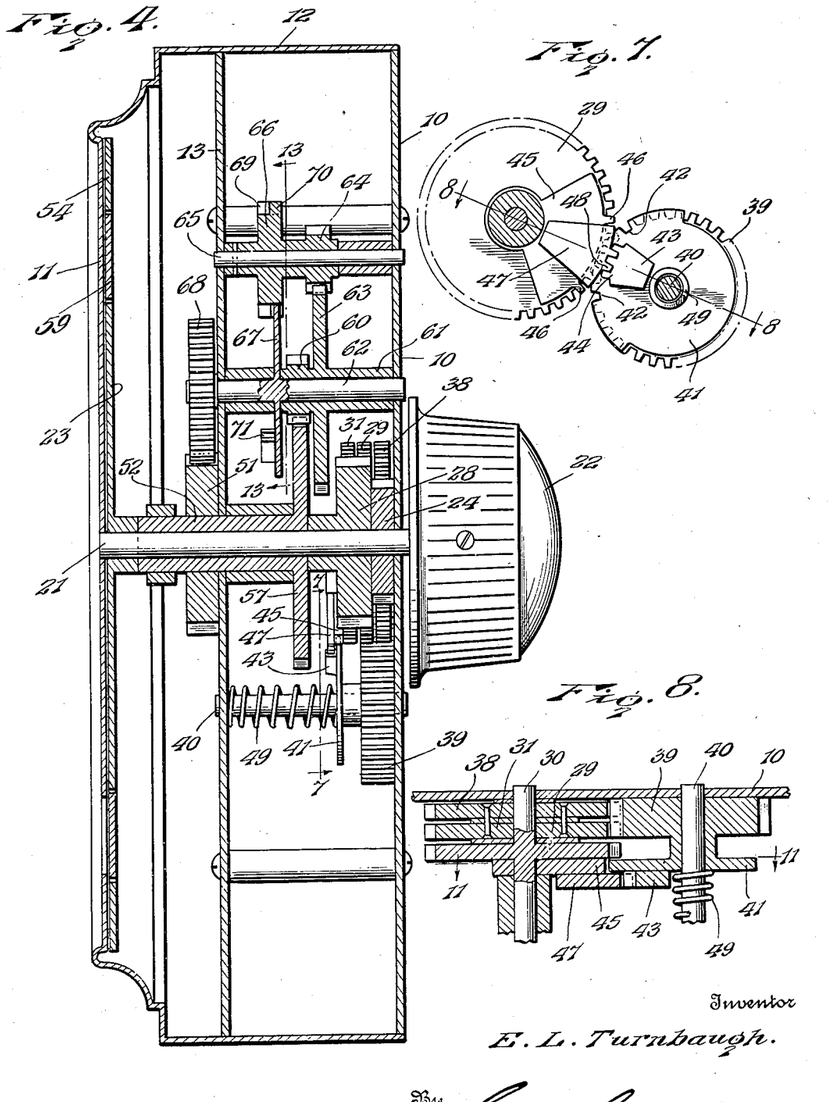
Figure 4 is an enlarged horizontal section of the calendar on the line 4—4 of Figure 3.
Figure 7 is a detail section taken on the line 7—7 of Figure 4.
Figure 8 is a detail section taken on the line 8—8 of Figure 7.
Figures 5, 6, 18, 19, 20, 21, 22, 23, 24:
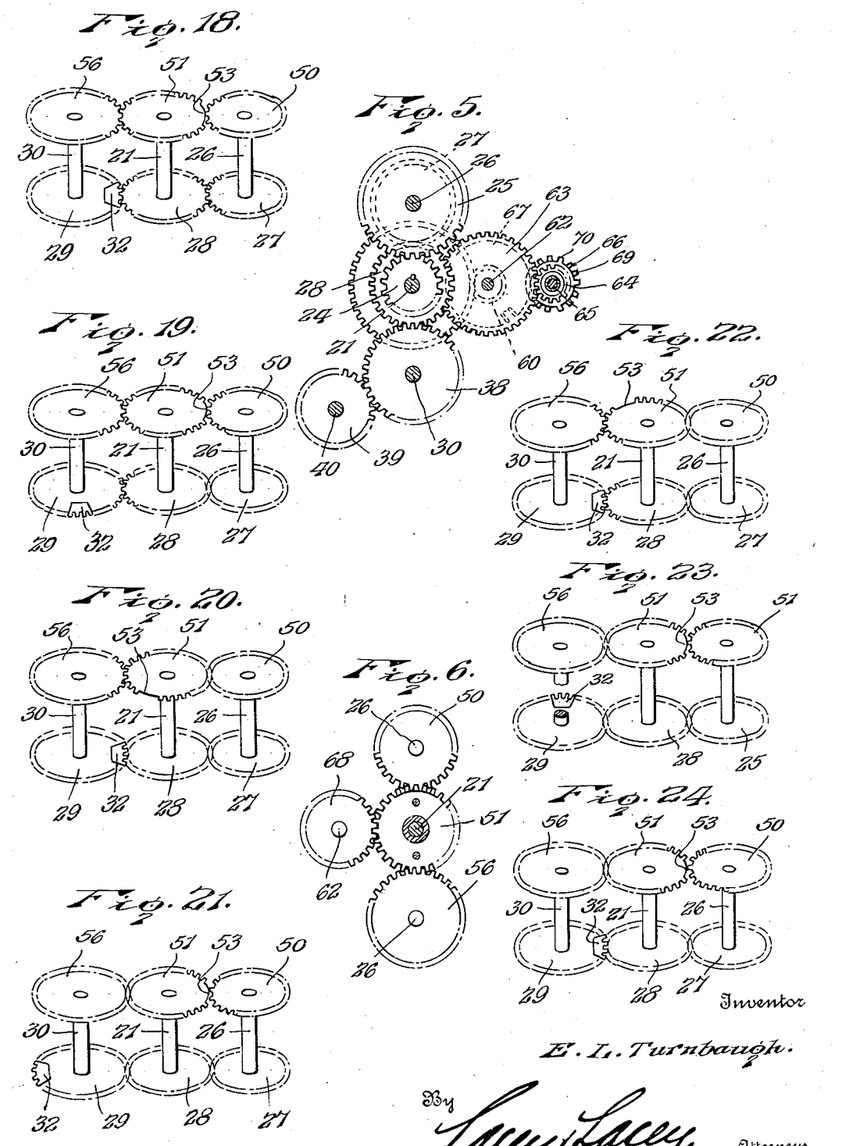

A gear 38, of forty-eight teeth, is fixed to the gear 31, preferably by means of the above mentioned rivets 34, and as shown in Figure 8, the gear 38 and the gear 31 both mesh with a gear 39 of thirty-six teeth. The gear 39 is fixed to a shaft 40 which is disposed below and laterally of the shaft 30 as best shown in Figures 4 and 5.

Fixed to the shaft 40 contiguous to the gear 39 is a disk 41 best shown in Figures 7, 8, 10 and 11. The disk is provided in its periphery with two notches 42 and on one side is provided with a short lever segment 43 having three teeth 44. The teeth and notches mesh, every four revolutions of the gear 39, with a disk 45 carried by the gear 29. The disk 45 is provided on its periphery with two teeth 46 and on one side is provided with a long lever segment 47 having two teeth 48.

The teeth 44 are disposed inwardly of the periphery of the disk 41, and the teeth 48 are disposed outwardly beyond the periphery of the disk 45, as shown. The disk 41 being rotated by gears 28, 31, 38 and 39 while in mesh with the disk 45, the gear 29 lags so that the gear 28 can gain one tooth to provide for the added day in each leap year as will later be fully described in detail.

A helical brake spring 49 encircles the shaft 40 and exerts pressure against the disk 41 to prevent movement of the gear 29 and hold the gears 31 and 38 stationary while the one tooth gap in the gear 29 is being closed.

Referring again to Figure 3, it will be seen that a gear 50 is fixed to the driven shaft 26 between the front wall 11 and the partition wall 13. The gear has thirty-six teeth and meshes with a gear 51 which is the master or key gear of the clockwork mechanism.

The key gear 51 is loosely mounted upon a sleeve 52 which is loose upon the drive shaft 21. The gear 51 has thirty-six teeth, six of which are partly removed, that is, are cut away to the center of the periphery of the gear as shown at 53 in Figure 17. The purpose of this construction is to permit the gear 50 to lag one tooth, which represents one day on the calendar during leap years only.

An annular month dial 54 bearing the month abbreviations is fixed to the gear 51 by means of a spider 55 and is exposed through the sight opening 15.

The key gear 51 meshes with a gear 56 of forty-eight teeth which is fixed to the same shaft 30 as, and rotates concurrently with, the gear 31 which, as above explained, is provided with a one tooth gap.

Figure 2:
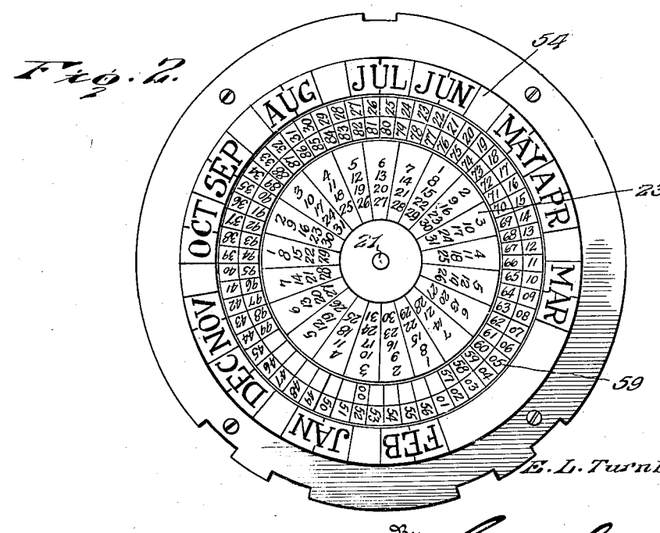
Figure 2 is a front elevation of the three concentric dials of the calendar.

Fixed to the inner end of the above mentioned sleeve 52 loosely mounted on the drive shaft 21, is a gear 57 having fifty-six teeth. The outer end of the sleeve carries a spider 58 which supports an annular year dial 59 bearing the year designations of two centuries arranged in concentric annuli, each having fifty-six divisions to correspond to the number of teeth on the gear 57, as shown in Figure 2. The year designations are exposed through the sight openings 17 to 20, inclusive, in the front wall of the casing, as shown in Figure 1.

For actuating the year dial 59 a reduction gear train is employed comprising a pinion 60 of sixteen teeth which meshes with the gear 57 and is integral with a sleeve 61 that is loosely mounted on a shaft 62 disposed laterally of the drive shaft 21, as shown best in Figures 4, 5, and 6. A gear 63 of forty-eight teeth is also formed integral with the sleeve 61 and meshes with a pinion 64 of fifteen teeth which is mounted on a shaft 65 disposed laterally of the shaft 62. Integral with the pinion 64 is an escapement gear 66 which is fixed to the shaft 65 and meshes with a disk 67 that is fixed to the shaft 62. A gear 68 of thirty-six teeth is fixed to the shaft 62 and meshes with the key gear 51.

The escapement gear 66, as best shown in Figures 13 and 16, is provided with an annular series of fifteen teeth 69 on one side of the central circumferential line of its periphery and an annular series of five teeth 70 on the other side of said line. The disk 67 is provided with a notch 70' in its periphery and on one side is provided with two teeth 71 contiguous to the notch, as shown in Figure 15. Every revolution of the disk, the teeth 71 mesh with the teeth 69 of the escapement gear 66 and cause said gear to turn a distance of three teeth which movement is transmitted through the reduction gear train to turn the gear 57 one tooth and move the dial 59 to register a year on the calendar.

Two of the five teeth 70 on the escapement gear engage the edge of the disk 67 as shown in Figure 13 and prevent the escapement gear from turning until the notch 70' meshes with one of said two teeth, in which position the teeth 71 of the disk are in proper position to mesh with the teeth 69 and turn the escapement gear, as shown in Figure 14.

Figure 25:
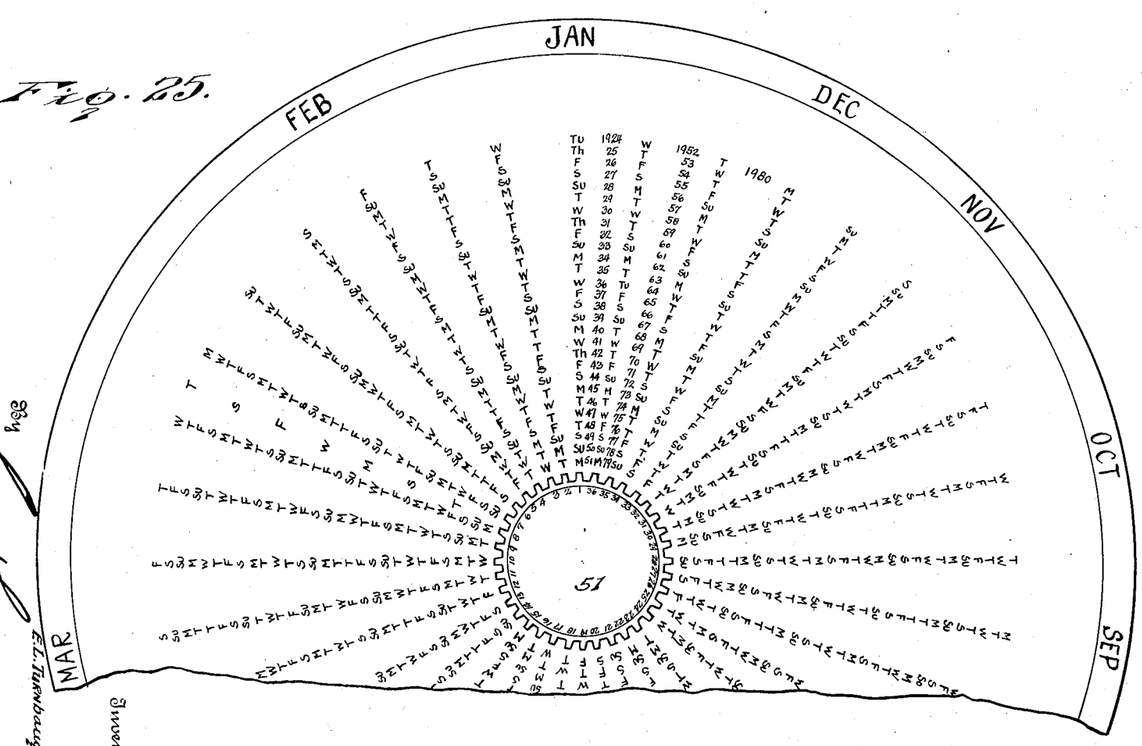
Figure 25 is a front elevation of a chart and the key gear upon which the principle of the invention is based.

In order to understand the underlying principle of the two century mechanical calendar, reference should be had to the chart shown in Figure 25. It will be noted that a plurality of concentric circles have been drawn and abbreviations of week days are arranged in radial rows on the circles. The circles represent years. The radial rows represent week days, which are counted in sequent order, in addition, and the rows 1, 4, 11, 14, 16, 19, 21, 24, 27, 29, 32 and 34, also represent the months of Jan., Feb., March, April, May, June, July, Aug., Sept., Oct., Nov., and Dec., respectively, the abbreviations for these month rows also indicating the first day of each month.

The years are so arranged in both centuries as to show just what years had or will have the same week days beginning the months. For example, the years 1924 and 1952 began or will begin for the month of January on Tuesday, for the month of February began or will begin on Friday, for the month of March began or will begin on Saturday and so on up to and including December. This information is charted for all the years of the two centuries 1800 to 1999. There are twenty-eight concentric circles which represent twenty-eight years indicating that the formula completes its cycle every twenty-eight years and then begins all over again.

The key gear 51 is substituted for the week days in the chart, each tooth representing a week day to be counted in sequence and each tooth is numbered, by way of example, from 1 to 36.

By starting at a given point or tooth, for instance tooth 1, as of January 1st, 1924, leap year, it will be seen that Tuesday, the correct day that begins the month of January, 1924, has been assigned to this tooth. By counting from right to left the next tooth 2 will represent Wednesday, the next tooth 3 will represent Thursday, the next tooth 4 will represent Friday and so on in sequence until tooth 6 has been counted.

Between tooth 6 and tooth 9 an extra tooth or the equivalent of an extra day is added (leap years only), said extra tooth or day added being accomplished by the assistance of the novel gears 29 and 31 as will later appear. For convenience this extra tooth or extra day is interposed leap years between teeth 7 and 8. This extra tooth is assigned the week day Tuesday, therefore, tooth 8 will represent Wednesday, tooth 9 will represent Thursday, tooth 10 will represent Friday, and so on around the gear until back at the starting point which is tooth 1 and will represent Thursday January 1st for the year 1925.

Continue the count in sequence and tooth 2 will represent Friday, 3 will represent Saturday, 4 will represent Sunday, 5 will represent Monday, 6 will represent Tuesday, 7 will represent Wednesday, 8 will represent Thursday, and so on in sequence until back at the starting point, tooth 1, which represents Friday, January 1st, for the year 1926.

This same sequence count may be continued until the years up to and including 1951 have been recorded and the twenty-eight year cycle completed. Then Tuesday January 1st, 1952 will be the new year, which begins the next twenty-eight year cycle, starting with tooth 1, Tuesday. By continuing the same week day count in sequence as the previous twenty-eight years, the starting point Tuesday, January 1st, 1980 will be reached, which completes another cycle.

The chart, in addition to showing the week day count as applied to the teeth of the key gear 51, also shows the fixed position of the twelve months, as provided by the annular month dial 54. It will be noted that January has a fixed position on the dial as of tooth 1 on the key gear 51, February as of tooth 4, March as of tooth 11. Although not illustrated, April has a fixed position as of tooth 14, May as of tooth 16, June as of tooth 19, July as of tooth 21, and August as of tooth 24. As illustrated September has a fixed position as of tooth 27, October as of tooth 29, November as of tooth 32 and December as of tooth 34.

It will also be noted by referring to the chart that the week days which register the beginning of the months, with reference to the fixed position of the months, indicates that said week days represent the first day of the week on which said months begin. For example January 1924 began on Tuesday, February on Friday, March on Saturday, etc.

After twenty-eight revolutions of the key gear 51 have taken place the cycle has been completed, and the same week days appear in the same order again for the next cycle of twenty-eight years, etc. By reversing the direction in which the gear 51 is turned the week day count will also be reversed, the count being then backward instead of forward.

All gears of the clock work mechanism are constructed as to structure and ratio to co-ordinate with the key gear 51 just described and a detailed explanation of the same will now be given.

Gear 24 counts the week days in sequence and has twenty-one teeth to correspond to the twenty-one divisions of the circular week day dial 23, each division of which represents one tooth on the gear so that for every tooth turned on gear 24 a corresponding division of the dial is concurrently turned. The disk exposes one month through the sight opening 16 in the front wall of the casing and always shows thirty-one days.

The dial 23, therefore, counts the week days in sequence when the knob 22 is rotated. For example, see Figure 1, assume the numeral 1 on the dial is set as of the week day Friday in the week day heading 72 marked on the front wall 11 of the casing. When the gear 24 is now turned one tooth the numeral 1 will advance and register Saturday, and so on indefinitely.

By meshing gear 25, a thirty-six tooth gear, with gear 24, the former also becomes a week day counter. Starting at a given tooth on gear 25, said tooth to correspond to the same Friday the 1st set on the dial 23 as above described, by rotating the gear from right to left the next tooth turned will represent Saturday and so on indefinitely in sequent order. Turning in the reverse direction will reverse the week day count by counting backward instead of forward.

The gears 24 and 25 have a different pitch than any of the other gears in the device. The gears 27, 28, 29, 31, 50, 51 and 56 are all of the same pitch. This identity of pitch is necessary so that the four tooth segment 32 will be in a position to advance one tooth every four revolutions of the key gear 51, as will now be explained, reference being made to diagrammatic Figures 18 to 23, inclusive.

These figures show that the loose key gear 51 of thirty-six teeth, six of which are partly removed as at 53, is meshed on one side with the gear 56 of forty-eight teeth, which is rigidly secured to the shaft 30. On the other side the key gear 51 is meshed with the drive gear 50 of thirty-six teeth which is rigidly secured to the shaft 26. It will also be observed that the gear 29 is fixed on the same shaft 30 as the gear 56 and that both gears rotate concurrently. The gear 28 of thirty-six teeth is loose on the same shaft 21 as the key gear 51 and meshes with the gear 29. The loose gear 28 also meshes with the gear 27 having thirty-six teeth which is fixed to the same shaft 26 as the drive gear 50.

The gear 31, carrying segment 32, co-ordinates with the gear 29 in such manner that the gear 31 can only advance or subtract a one tooth gap depending on the direction of rotation, whereupon it forces the gear 29 to turn with it, and vice versa. The two gears 31 and 29 jointly present forty-eight teeth but as heretofore explained a four tooth segment 32 on the gear 31 fits in a five tooth space provided in the gear 29, which allows one tooth play, permitting an extra tooth to be added or subtracted every four revolutions of the key gear 51, and at a given point.

Now by referring to Figure 18 it will be seen that the four tooth segment 32 of the gear 31 is meshing with the gear 28. The four tooth segment is now in position to cause gear 28 to advance an extra tooth when gear 28 rotates and close the one tooth gap in gear 29.

In the operation of closing this one tooth gap, gears 24, 25, 27, 28 and 50 advance one extra tooth or the equivalent of one extra day. While this operation is taking place it requires the rotation or turning of six teeth on gears 29, 56 and the key gear 51, and the rotation or turning of seven teeth on gears 24, 25, 27, 28, 31, 38, 39 and 50, or a gain of one tooth.

In the position shown in Figure 18, termed for convenience the starting position, the key gear 51 is so set that the space 53 presented by the partly removed six teeth permits the gear 50 to advance without interference. While the gear 51 is traveling the space of the six partly removed teeth the gear 50 has traveled seven teeth, or one tooth extra, leap years only.

By turning the control knob 22 to cause one revolution of the key gear 51, the four tooth segment 32 of gear 29 will arrive at the position shown in Figure 19, in which position the gap of the six partly removed teeth 53 of the key gear is again at the starting point.

Now by turning the control knob so that the key gear will advance one third revolution more, as indicated by Figure 20, it will be noted that the four tooth segment 32 is in the same position as Figure 18, or starting point, while the gap 53 of the key gear 51 is in a different position from that shown in Figure 18. While in this position the four tooth segment 32 is meshing with the gear 28, but due to the position of the six tooth gap 53 of the key gear no extra tooth advance can be accomplished, this being obvious from the fact that the gear 50 is meshing with the key gear and will not permit the four tooth segment to advance. Therefore, in this position the four tooth segment must rotate in regular order and cannot advance or subtract.

By now turning the control knob so that the remaining two-thirds of the key gear 51 is used up, the gear will have made two complete revolutions and assumed the position shown in Figure 21. In this position, it will be observed that the four tooth segment 32 is in another position, or different position than any previous position, while the six tooth gap 53 are again at the starting point. It is now clear that the four tooth segment has by this time, after two revolutions of the key gear, been able to mesh with the gear 28 twice but only once has been able to cause the gear 28 to advance one extra tooth.

By again turning the control knob so that the key gear 51 will make two-thirds revolution more, the parts will arrive at the position shown in Figure 22. It will now be observed that the four tooth segment 32 is meshing again with the gear 28 and is ready, if it can, to cause the gear 28 to advance on extra tooth. However, by noting the position of the gap 53 it will be clear that the gear 50 is meshing with the key gear 51, therefore advance of an extra tooth cannot be made since the gap 53 is not in the correct position to allow the gear 50 to advance.

Turning of the control knob one-third revolution more, advances the position of the four tooth segment 32 to the position shown in Figure 23 and presents the gap 53 to the gear 50. In this position of the parts, the gear 50 is free to advance but cannot do so because the gear 28 is not meshing with the four tooth segment 32, therefore no advance can be made.

By now turning the knob so that the key gear 51 will make another complete revolution, it will be seen that the four tooth segment 32 is then in the position shown in Figure 24, or is again in the starting position. The gap 53 is also in the correct position to permit a one tooth advance.

It will now be recalled that the four tooth segment has made three revolutions and is back at the starting point, and also that the gap 53 has made four revolutions and is back at the starting point, ready to go through the same cycle indefinitely. Thus as stated hitherto, every four revolutions of the key gear 51 are equivalent to four years, and while the key gear is making these four revolutions, the gears 31, 29, 38, and 59 make three revolutions. Due to the novel construction of the gears 29 and 31, as above explained, at a given point in every three revolutions of these gears an extra tooth is added to the gear 28 which in turn adds an extra tooth to gears 24, 25, 27 and 50. Whenever this extra tooth is added, leap years only, it is the equivalent of an extra day.

Every time that the four tooth segment 32 is in position to cause a one tooth advance, see Figures 18 and 24, concurrently with the advance of the gears 24, 25, 27, 28 and 50, the gears 31, 38 and 39 will also advance an extra tooth. However, due to the action of gear 29 in closing a one tooth gap as elsewhere described, the one tooth advance gained on the gears 31, 38 and 39 is automatically subtracted from said gears, as will now be explained.

Just after said advance occurs on the gears 31, 38 and 39, a little further rotation will bring the gap 53 in position so that the opposite gear 28, see Figure 18, will be meshing with the gear 29 but will be out of mesh with the gear 31, and in this position the gear 29 is forced to advance a one tooth gap, closing said gap. While the gear 29 is closing the gap, the gears 31, 38 and 39 remain motionless. Therefore, as these gears remain motionless the gear 29 in closing the gap has the effect of subtracting the one extra tooth gained by the gears 31, 38 and 39 during the operation described. Therefore, due to this arrangement the gears 31, 29, 38 and 56 will only register forty-eight teeth for each revolution of said gears.

In addition to gear 56 being used to co-ordinate the general operation of the device, it is very necessary in controlling the key gear 51. As will be evident, when the key gear is in the position shown in Figure 18, due to the fact that the gear 50 is not meshing with the key gear, certain free movement of the key gear is permitted as far as the gear 50 is concerned. However, due to the key gear meshing with the gear 56 no free movement of the key gear can take place, and the gear 56 consequently forces the key gear to keep on rotating and functioning properly without error.

It is very important that the gear 50 mesh with the key gear 51 except at a given point in the latter for the purpose of preventing a one tooth advance when not needed. For example, an advance takes place once in every four revolutions of the key gear 51 and once in every three revolutions of the gears 31, 29, 38 and 56, as indicated by Figures 18 and 24. At all other times the gear 50 is in mesh with the key gear 51 and no extra tooth advance can take place.

By referring to Figure 9, it will be observed that the gear 31 has six teeth removed at two different places in the periphery of the gear, the teeth being removed at each side of the four tooth segment 32 on the gear. The purpose of this construction is to permit the gear 29 to advance against the four tooth segment 32 to close the one tooth gap shown best by dotted lines in Figure 12. While this gap is being closed by the gear 29 the gears 31, 38 and 39 are motionless.

This gap must be closed in order to have the four tooth segment 32 of the gear 31 in the correct position, so that the gear 28, see Figure 3, at the proper time, meshing with the four tooth segment, can advance one extra tooth. As shown in Figure 12, if the gear 29 is being turned from right to left the one tooth gap indicated by the dotted line must be closed just before the four tooth segment 32 meshes with the gear 28 otherwise the one tooth advance cannot occur. If the gear 29 is being turned from left to right, the gap will be located as shown by the dotted line indicating the four tooth segment in Figure 9, (gear 29) and must be closed just before the four tooth segment meshes with the gear 28. Hence it is necessary to have a smooth space equal to six teeth on the gear 31 on both sides of the four tooth segment.

While the removal of these teeth from the periphery of the gear 31 permits the gear 29 to advance against the four tooth segment 32 of the gear 31, it does not in any way interfere with the proper calculation or sequent order of the week day count as explained heretofore in connection with the key gear 51 and the gears 24, 25, 27, 28 and 50. This is due to the fact that while the gear 29 is advancing toward the four tooth segment 32 of the gear 31, closing the one tooth gap, the gears 31, 38 and 39 are motionless due to the fact that the advance of the gear 29 occurs only at the place 37 where the six teeth have been removed. Owing to the teeth being removed it is impossible for the gears 31 and 38 to rotate at this particular point since the gear 28 cannot mesh with the gear 31 at this point. Therefore, gears 31, 38 and 39 must remain stationary until after the advance of gear 29 has taken place to close the gap, whereupon the gear 29 will force the gear 31 to rotate with it.

Gear 38 is a forty-eight tooth gear fixed solidly to the gear 31 to rotate as a unit therewith, and both of these gears mesh with the gear 39. The gear 39 has thirty-six teeth, consequently every three revolutions of the gear 38 imparts four revolutions to the gear 39, as above explained.

The gear 39 and the disk 41 play an important part in the proper functioning of the four tooth segment 32 as follows: The gear 39, gear 38 and disk 41 concurrently advance when the gear 31 delivers a one tooth advance to the gear 28 each leap year. As shown in Figure 7, the two notches 42 on the disk 41 represent a distance between them of five notches or grooves on the gear 39. These two notches mesh with the two teeth 46 of the disk 45 carried by the gear 29. The two teeth 46 have a separation or distance between them of four teeth on the gear 29. Therefore, in order to make the two notches 42 mesh with the two teeth 46 the disk 41 must increase its speed one extra tooth, beginning as and when the first notch on the disk 41 and the first tooth 46 mesh with each other and continuing until the second notch 42 and the second tooth mesh, and accomplishes an extra tooth gain on the disk 41. Said extra tooth gain also registers an extra day, leap years only, on the dial 23 by advancing gears 26, 27, 25, 24 and 50 an extra tooth.

The three teeth 44 embodied on the disk 41 and the two teeth 48 embodied on the gear 29 that mesh with each other, provide the necessary apparatus, first, to insure the two notches 42 embodied on the disk 41 meshing with the two teeth 46 embodied on the gear 29, and second, by speeding up the disk 41 (due to the teeth 48 having longer radii than the teeth 44) is responsible for increasing the speed of the gear 39 so that one tooth may be gained regardless of how fast or how slow gear 39 is rotated or in which direction it is turned.

It will be particularly pointed out that the further from the center of the gear 29 the teeth 48 extend, and the closer to the center of the disk 41 the teeth 44 remain, the faster the gear 39 will turn when meshing with or through the teeth 48. The teeth 48 are virtually a long lever while the teeth 44 are a short lever. This is the principle used to gain an extra tooth or the equivalent of an extra day, leap years only, for a given distance rotated, as above described.

The spiral spring 49 is used for the purpose of adding resistance to the gear 39 which meshes with the gears 31 and 38 so that when one tooth gap on gear 31 is being closed, as described elsewhere, by the gear 29, the spring materially assists in holding the gears 31, 38 and 39 stationary until after the gap is closed.

The gear 57 has fifty-six teeth to correspond with a like number of fifty-six divisions of the dial 59, shown best in Figure 2, one tooth on the gear representing one division on the dial. Thus for each tooth turned on the gear 57 a corresponding division on the dial will be turned.

The dial 59 carries two annular series of numerals beginning with 00 and ending with 99, to be read in conjunction with the numerals 18 and 19 marked on the front wall of the casing to the left of the sight openings 17 to 20, as shown. The numerals 18 and 19 represent the first two numerals covering each year in those centuries and the other numerals of the dial exposed through the sight openings 17 to 20 represent the last two numerals covering each year in those centuries. The sight openings will expose from two to four years at a time, and the months, on the dial 23, are always the same for said years shown.

The gear 68 has thirty-six teeth to correspond to the thirty-six teeth of the key gear 51 with which it meshes. Therefore, as each revolution of the key gear represents a year, each revolution of the gear 68 will likewise represent one year. The gear 68 is fixed to the shaft 62 as is likewise the disk 67 so that each revolution of the gear 68 causes a revolution of the disk.

As each revolution of the disk 67 represents a year it is necessary to construct the gear 66 in a novel manner so that for every revolution of the gear 68 and disk 67, the gear 66 will turn or register one tooth on the gear 57 which in turn represents one division on the dial 59, or one year.

By referring to Figure 13 it will be observed that the disk 67 is of such size that it fits between two teeth 70 of the five teeth on one half of the gear 66, and that these two teeth lay up against the periphery of the disk and normally prevent turning of the gear 66. The gear 66 is also provided with fifteen teeth 69 on the opposite half of its periphery which overlap the side of the disk 67 and are disposed in the path of two teeth 71 which are formed on the side of the disk and are separated by a notch 70' cut in the periphery of the disk.

As shown, the disk rotates freely between the two teeth 70 of the gear 66 without causing the gear to revolve until the notch 70' engages the first tooth 70 and the two teeth 71 mesh with the teeth 69 of the gear. Thereupon the gear 66 is turned a distance of three teeth only. After this the disk 67 will again rotate freely in another space as provided between two of the teeth 70 on the gear.

Every time the notch 70' and two embodied teeth 71 on the disk mesh through the gear 66, only three teeth of the fifteen teeth 69 of the gear are turned, or can be turned, therefore the disk 67 and the gear 66 jointly provide a safety, and consequently the gear can be termed an escapement gear.

The escapement gear 66 automatically locks all gears controlling the movement of the gear 57 which actuates the year dial 59. The escapement gear thus prevents the gear 57 from turning until a new year is ready to be shown or registered on the dial. The registering of said new year is accomplished by the notch 70' and two embodied teeth 71 on the disk 67 meshing through and turning the escapement gear 66.

By again referring to Figure 4 it will be seen that the pinion 64 is fixed to the same shaft 65 as the escapement gear 66. As both the gear and the pinion have fifteen teeth it is clear that for every three teeth turned on the gear 66 three teeth will concurrently turn on the pinion.

The pinion meshes with the gear 63 which has forty-eight teeth and a pinion 60 of sixteen teeth is fixed to this gear. The gear 63 and pinion constitute a reduction train since for every three teeth turned on the pinion 64, three teeth will be turned on the gear 63, but since the gear has forty-eight teeth and the pinion attached thereto has only sixteen teeth, only one tooth will be delivered on the pinion, that is the ratio is three to one.

Since the pinion 60 meshes with the gear 57, it will now be seen that the pinion can move only one tooth on the gear 57 for every three teeth turned on the escapement gear 66, pinion 64 and gear 63, which tooth on the gear 57 represents one division on the year dial 59, or one year.

Referring now to Figure 2 it will be seen that the week day dial 23 is a circular dial bearing three radial groups of numbers from one to thirty-one inclusive, arranged spirally, and designating the days of the month. The numeral 1 of each group is arranged directly over the numeral 8 in the same group, said group extending over the entire face of the dial. The three groups are so disposed that when viewed through the sight opening 16 in the casing the numbers or numerals visible always show thirty-one days regardless of the position of the numeral 1.

For example by starting the numeral 1 at Friday as shown in Figure 1, and turning the dial clockwise until the numeral 1 registers Saturday, it will be observed that concurrently therewith the numerals that formerly represented Saturdays have passed out of view and under the Saturday column a new set of numerals appear. However, concurrently with the turning out of the numerals from the Saturday column these same numerals appear in the Sunday column. At the same time there still are exposed thirty-one days.

By starting the numeral 1 at a given week day, say Friday, and rotating the disk until the same numeral 1 is back at the starting point, twenty-one divisions or twenty-one days will have been consumed, therefore as each division represents one day, it is necessary to use a day count gear 24 having twenty-one teeth. If, however, a dial were used carrying two groups of numbers, the dial would then have fourteen divisions and a day count gear of fourteen teeth would be used. If a dial carrying four groups of numbers were used the dial would then have twenty-eight divisions and a day count gear of twenty-eight teeth would be used.

The numerals on the dial 23 must be arranged spirally in order to bring about the proper numerical order in sequence covering a month of thirty-one days when viewed through the sight opening 16, regardless of on what day the month begins. The numerals, it will be pointed out, are always in numerical order regardless of the position of the numeral 1 which shows on what week day the month begins.

In operation, assume that the calendar is set as of Tuesday, January 1st, 1924, leap year. By now turning the control knob 22 so that three teeth are turned on the gear 24, three teeth will be concurrently turned on the gears 25, 27, 28 and 50, also on the gears 31, 29, 38, 39, 56 and 51. The three teeth turned will place numeral 1 of the week day dial 23 as registering Friday and concurrently the month dial 54 will be turned and in the sight opening 15 of the casing the month of February will appear. This is because the distance between January and February, see Figure 2 also the chart Figure 25, is only three teeth as turned on the key gear 51.

By now turning the control knob so that the key gear 51 will expose March in the sight opening, seven teeth will be turned on the key gear, and due to 1924 being a leap year, eight teeth will be turned on the gears 24, 25, 27, 28 and 50, this being accomplished by the novel construction of gears 31, 38 and 29 in conjunction with the disk 41 and the disk 48 on the gear 29 as heretofore explained. The disk 54, displaying the names of the months, is thus relatively held back one day before changing.

Continue to turn the control knob in the same direction to cause three more teeth to be turned on the gears 24, 25, 27, 28 and 50. The numeral 1 will then register Tuesday. Concurrently with the turning of said three teeth, gears 31, 29, 38, 39, 56 and 51 will advance three teeth and thereby advance dial 54 so that April will appear in the sight opening. By now observing the numeral 1 it will be seen that it is registering Tuesday and this indicates that the first day of April 1924 begins on Tuesday.

The above operation may be continued until the month of January appears in the sight opening, at which time, and concurrently with the registering of January a new year 1925 will appear in the sight opening 20 of the casing. The operation may be continued indefinitely until both centuries have been registered.

The registration of the year, or operation of the year dial 59 may be briefly described as follows. Every complete revolution of the key gear 51 causes a complete revolution of the gear 68, and every revolution of the latter causes a complete revolution of the disk 67. Every revolution of the disk 67 will cause three teeth to be turned on the gear 66 and the pinion 64. These three teeth, due to the reduction train comprising the gear 63 and pinion 60, will deliver only one tooth on the year gear 57, and the latter gear turning through one tooth advances the year dial 59 to expose the next succeeding year through the corresponding sight opening.

The week day dial always shows thirty-one days. For the months containing 28, 29 and 30 days all the operator need do is simply turn the dials to the next succeeding month and by noting on which day of the week the first of the following month falls, the operator can quickly see by turning back to the previous month on which day the previous month ends.

From the above description it is thought that the construction and operation of the invention will be fully understood without further explanation.

What is claimed is:

1. In a mechanical calendar, concentric dials bearing respectively the months, the years and the week days for a plurality of years, gear mechanism for actuating the dials, certain of the gears being adapted to have one tooth play, and means embodied in certain others of the gears for retarding one of the loose play gears to compensate for the extra day in each leap year.

2. In a mechanical calendar, concentric dials bearing respectively the months, the years and the week days of a plurality of years, co-ordinating gears for actuating the dials, certain of the gears being loose, one of the loose gears having a one tooth play, a long lever carried by one of the gears, and a short lever carried by another of the loose gears, said levers being toothed and meshing at the ends and functioning to retard the gear having the one tooth play to hold back the month dial one day each leap year.

3. In a mechanical calendar, concentric dials bearing respectively the months, the years and the week days of a plurality of years, gear mechanism for actuating the dials, one of the gears having a section of teeth removed, said section being reduced one tooth, said reduced section being fixed to the side of the next laterally disposed gear and disposed to project into the space of the first named gear from which said teeth were removed whereby to provide a one tooth gap in the first named gear, and coacting means carried by the first named gear and certain of the adjacent gears for causing the laterally adjacent gears to move at relatively different speeds to close the gap and retard the month dial to compensate for the extra day each leap year.

4. In a mechanical calendar, concentric dials bearing respectively the months, the years, and the weeks days of a plurality of years, gear mechanism for actuating the dials, certain of the gears being loose, one of the loose gears having a one tooth play, a disk carried by said gear having spaced teeth, a disk fixed to another of the loose gears having two spaced notches in the periphery adapted to mesh with said teeth, and meshing teeth of different respective radii carried by both disks between said spaced teeth and notches, said disks and said meshing teeth being adapted to produce relatively different speeds in the disks whereby to retard the month dial to compensate for the extra day each leap year.

5. In a mechanical calendar, concentric dials bearing respectively the months, the years, and the week days of a plurality of years, and clock work mechanism for actuating the dials including superposed shafts, spaced gears fixed on the upper shaft, spaced loose gears on the intermediate shaft meshing with the gears of the upper shaft, one of the gears on the intermediate shaft constituting a key gear and having a section of teeth removed to provide a smooth space, spaced gears fixed to the lower shaft meshing with the gears of the intermediate shaft, one of the gears of the lower shaft having a gap therein, a loose gear on the lower shaft having a toothed sector fitting into said gap and providing a one tooth play between the last named gears, and means coacting with the gear carrying the sector to add one day each leap year to the key gear.

6. In a mechanical calendar, concentrically disposed month, year and week day dials covering a plurality of years, a shaft fixed to the week day dial and actuating the week day dial, a key gear loose on the shaft and fixed to the month dial, means for operatively connecting the key gear to the shaft to rotate at less speed intermittently therewith to provide for an extra day each leap year, and means operated by the key gear to advance the year dial at the end of each revolution of the key gear.

7. In a mechanical calendar, concentrically disposed month, year and week day dials covering a plurality of years, a shaft for rotating the week day dial, a key gear loose on the shaft for rotating the month dial, means operatively connecting the key gear to the shaft for intermittent rotation at a less speed than the shaft to provide for an extra day each leap year, a gear meshing with the gear key, an escapement gear operatively driven by the last named gear and adapted to advance part of a revolution during each complete revolution of the last named gear, and a reduction train of gears operatively connecting the year dial with said escapement gear.

8. In a mechanical calendar, concentric dials bearing respectively the months, the years, and the week days of a plurality of years, a main shaft, a key gear on the shaft, operative gear connections between the shaft and key gear, said shaft and key gear controlling the week day and month dials, a gear driven by the key gear, a shaft to which the driven gear is fixed, a disk on said shaft having a notch and two teeth at the notch, an escapement gear having a predetermined number of teeth on the periphery adapted to mesh with the teeth of the disk and having a lesser number of teeth on the periphery laterally of the first named teeth adapted to engage the edge of the disk and hold the escapement gear stationary until the disk teeth mesh with the escapement gear and one of said lesser number of teeth engages in said notch, and means for imparting step rotation of the escapement gear to the year dial.

9. In a mechanical calendar, concentrically disposed month, year and week day dials covering a plurality of years, the week day dial bearing a plurality of radial groups of numbers, the numbers being arranged spirally, the numbers of each group being arranged in numerical sequence with the number 1 of each group directly above the number 8 of the same group, clock work mechanism for actuating the dials, certain elements of the mechanism being adapted to add one day each leap year, and a casing for the calendar having sight openings adapted to expose a month on the month dial, thirty-one days on the week day dial, and a plurality of years simultaneously on the year dial, there being week day abbreviations marked on the casing above the week day dial to be read in conjunction with the numerals on said dial.

10. In a mechanical calendar, concentrically disposed month, year and week day dials covering a plurality of years, the year dial having two annular series of numbers beginning with 00 and ending with 99, clock work mechanism for actuating the dials, certain elements of the mechanism being adapted to add one day each leap year, and a casing for the calendar having a sight opening exposing the month dial, a sight opening exposing the week day dial, and pairs of sight openings exposing the year dial at four points, there being the first two numerals of a century marked on the casing opposite each pair of said sight openings to be read in conjunction with the numerals exposed through the sight openings.

ELBERT L. TURNBAUGH. [L. S.]